US012561509B2

(12) United States Patent

He et al.

(10) Patent No.: US 12,561,509 B2
(45) Date of Patent: Feb. 24, 2026

(54) PAGE LAYOUT METHOD AND APPARATUS

(71) Applicant: Huawei Cloud Computing Technologies Co., Ltd., Guizhou (CN)

(72) Inventors: Jia He, Beijing (CN); Feiyang Pan, Gui'an (CN); Xin Jin, Beijing (CN); Dandan Tu, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 264 days.

(21) Appl. No.: 18/360,497

(22) Filed: Jul. 27, 2023

(65) Prior Publication Data

US 2023/0376674 A1 Nov. 23, 2023

Related U.S. Application Data

(63) Continuation of application No. PCT/CN2021/127122, filed on Oct. 28, 2021.

(30) Foreign Application Priority Data

Jan. 28, 2021 (CN) .......................... 202110118584.2

(51) Int. Cl.
| | |
|---|---|
| *G06F 40/103* | (2020.01) |
| *G06N 3/006* | (2023.01) |
| *G06N 3/092* | (2023.01) |
| *G06N 20/00* | (2019.01) |

(52) U.S. Cl.
CPC ........... *G06F 40/103* (2020.01); *G06N 3/006* (2013.01); *G06N 3/092* (2023.01); *G06N 20/00* (2019.01)

(58) Field of Classification Search
CPC ....... G06F 40/103; G06F 8/38; G06N 3/0464; G06N 3/006; G06N 3/092; G06N 20/00; G06N 7/01; G06N 3/044; G06N 3/08
See application file for complete search history.

(56) References Cited

U.S. PATENT DOCUMENTS

| | | | | |
|---|---|---|---|---|
| 11,144,717 | B2 * | 10/2021 | Bedi ..................... | G06F 40/186 |
| 2006/0200759 | A1 | 9/2006 | Agrawala et al. | |
| 2017/0329747 | A1 * | 11/2017 | Noursalehi ............. | G06N 7/01 |
| 2020/0134388 | A1 * | 4/2020 | Rohde .................... | G06F 40/14 |
| 2020/0265105 | A1 | 8/2020 | Cui | |

FOREIGN PATENT DOCUMENTS

| | | |
|---|---|---|
| CN | 111179382 A | 5/2020 |

OTHER PUBLICATIONS

Sou Tabata et al, "Automatic Layout Generation for Graphical Design Magazines," SIGGRAPH 19 Posters, Jul. 28-Aug. 1, 2019, Los Angeles, CA, USA Sou Tabata, Hiroki Yoshihara, Haruka Maeda, and Kei Yokoyama, total 2 pages.

\* cited by examiner

*Primary Examiner* — Nicholas Ulrich
(74) *Attorney, Agent, or Firm* — Conley Rose, P.C.

(57) ABSTRACT

A page layout method includes obtaining page information, element information of at least one page element to be laid out, and a layout rule; obtaining at least one candidate page layout policy based on the page information, the element information, and the layout rule using a reinforcement learning algorithm; and determining a target page layout policy from the at least one candidate page layout policy using an imitation learning algorithm.

20 Claims, 10 Drawing Sheets

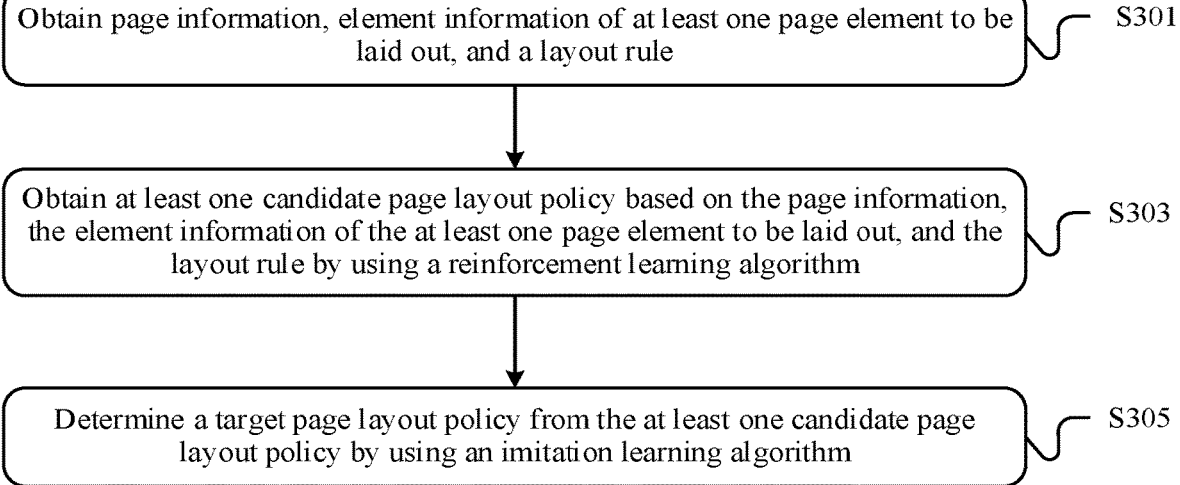

Obtain page information, element information of at least one page element to be laid out, and a layout rule — S301

Obtain at least one candidate page layout policy based on the page information, the element information of the at least one page element to be laid out, and the layout rule by using a reinforcement learning algorithm — S303

Determine a target page layout policy from the at least one candidate page layout policy by using an imitation learning algorithm — S305

FIG. 3

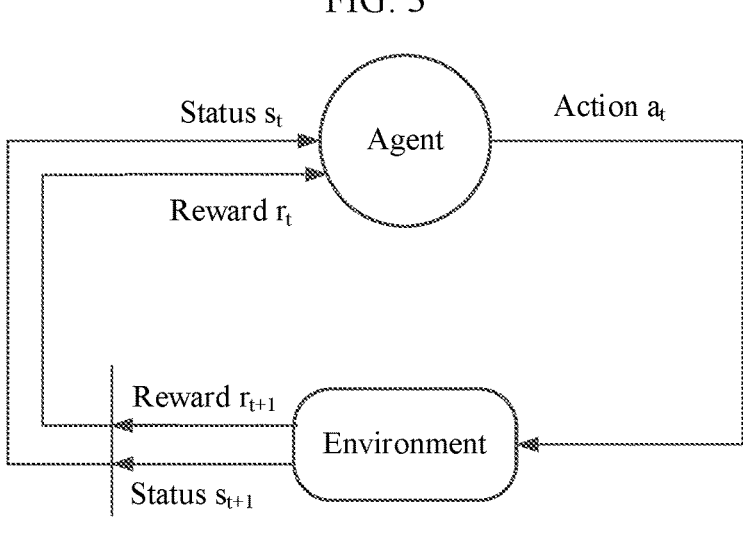

Status $s_t$          Action $a_t$

Agent

Reward $r_t$

Reward $r_{t+1}$

Environment

Status $s_{t+1}$

FIG. 4

PAGE LAYOUT METHOD AND APPARATUS

CROSS-REFERENCE TO RELATED APPLICATIONS

This is a continuation of International Patent Application PCT/CN2021/127122 filed on Oct. 28, 2021, which claims priority to Chinese Patent Application No. 202110118584.2 filed on Jan. 28, 2021. The disclosures of the aforementioned applications are hereby incorporated by reference in their entireties.

TECHNICAL FIELD

This disclosure relates to the field of artificial intelligence (AI) technologies, and in particular, to a page layout method and apparatus.

BACKGROUND

A page layout is a core of design work, and is also most time-consuming work for designers in a process of making pages. The page layout requires deploying page elements of different quantities, shapes, and sizes on a limited page. In addition, some specific rules and aesthetics need to be met between page elements and pages, and between page elements.

In recent years, with development of artificial intelligence technologies, development of the page layout gradually focus on using machine learning to replace manual work. An automatic layout is to use computer technologies to replace human designers for a page layout, and use artificial intelligence technologies to meet requirements of the page layout. Generally, operation of trained staff is not required for the automatic layout, so that labor consumption and training time of the designers can be greatly reduced and saved. In a related technology, a plurality of page elements may be deployed on a canvas in a random layout mode. A laid-out page is converted into image data, then the image data is scored by using an evaluation model, and finally a page layout with a high score may be selected by a user. It can be learned from a mode of automatically generating a page layout in the related technology that it is difficult to generate a page conforming to a rule in the random layout mode. Particularly, with an increase in a quantity of page elements, and a page size, it is easy to generate a page layout that does not conform to a rule and in which page elements overlap, or a page element is deployed within a boundary area.

Therefore, an automatic page layout mode that conforms to a layout rule is urgently needed in the related technology.

SUMMARY

In view of this, a page layout method and apparatus are provided.

According to a first aspect, an embodiment of this disclosure provides a page layout method, where the method includes obtaining page information, element information of at least one page element to be laid out, and a layout rule, obtaining at least one candidate page layout policy based on the page information, the element information of the at least one page element to be laid out, and the layout rule by using a reinforcement learning algorithm, and determining a target page layout policy from the at least one candidate page layout policy by using an imitation learning algorithm.

In the foregoing method, based on the layout rule, the candidate page layout policy is first obtained by using the reinforcement learning algorithm, and then the target page layout policy is determined by using the imitation learning algorithm, so that a page layout that better conforms to the layout rule and an aesthetic habit of a user can be obtained.

According to a first possible implementation of the first aspect, the layout rule includes a first-priority layout rule and a second-priority layout rule. The at least one candidate page layout policy meets the first-priority layout rule, and a reward obtained under a constraint of the second-priority layout rule is greater than a preset reward threshold.

In this embodiment, the layout rule is classified into a first-priority layout rule and a second-priority layout rule. A priority of the first-priority layout rule is higher than that of the second-priority layout rule. The first-priority layout rule may be used as a constraint condition when an agent performs an action. The second priority layout rule may be used as a basis for determining a reward value by an environment main body. In the foregoing implementation, the generated candidate page layout policy can completely meet a hard rule, and meet a soft rule as much as possible.

According to a second possible implementation of the first aspect, obtaining at least one candidate page layout policy based on the page information, the element information of the at least one page element to be laid out, and the layout rule by using a reinforcement learning algorithm includes the following steps.

Step 1: Laying out, on a page according to the layout rule based on the page information and element information of a first page element to be laid out, the first page element to be laid out, and generating a page status of the page.

Step 2: Determining, according to the layout rule based on the page status and element information of a next page element to be laid out, a layout location of the next page element to be laid out on the page.

Step 3: Determining a reward value corresponding to the page status and the layout location, and updating the page status, iterating step 2 and step 3 until the at least one page element to be laid out is laid out on the page, and a page layout policy is generated, and accumulating a reward value determined in each iteration, and using a page layout policy for which an accumulated reward value meets a preset condition as the candidate page layout policy.

In this embodiment of this disclosure, a page layout decision process is modeled as a reinforcement learning decision process, and a layout location of only one page element to be laid out is constrained by using the layout rule in each iteration process, so that the finally obtained candidate page layout policy can completely meet the layout rule.

According to a third possible implementation of the first aspect, the iterating step 2 and step 3 until the at least one page element to be laid out is laid out on the page, and a page layout policy is generated includes calculating an accumulated value of a reward value corresponding to each page status and each layout location in an iteration process, and determining policy merit of a current page layout policy based on the accumulated value of the reward value, and in a case in which it is determined that the policy merit is not less than a preset merit threshold, continuing to iterate step 2 and step 3 until the at least one page element to be laid out is laid out on the page, and the page layout policy is generated.

In this embodiment of this disclosure, in a reinforcement learning process, a Monte Carlo tree search algorithm is used to reduce search space of a page layout, so that search complexity can be greatly reduced in a case in which there are a large quantity of page elements to be laid out. In addition, by estimating long-term benefit of an intermediate node through a merit function, a page layout strategy with a higher reward value can be obtained while the search space is reduced.

According to a fourth possible implementation of the first aspect, determining a target page layout policy from the at least one candidate page layout policy by using an imitation learning algorithm includes determining a score of each candidate page layout policy based on a reward function obtained by pre-training an imitation learner, where the reward function is determined based on a ranking loss of a positive sample and a negative sample used for training the imitation learner, and the positive sample includes a page layout policy conforming to user aesthetics, and determining the target page layout policy from the at least one page layout policy layout based on the score.

In this embodiment of this disclosure, a page layout policy of a human expert is learned by using the imitation learning algorithm, so that aesthetics of the imitation learner are more similar to aesthetics of the human expert.

According to a fifth possible implementation of the first aspect, after determining the target page layout policy from the at least one page layout policy layout based on the score, the method further includes sending the target page layout policy, receiving an adjustment made by a user on the target page layout policy, and using an adjusted target page layout policy as the positive sample for training the imitation learner, and training the imitation learner to obtain an optimized reward function.

In this embodiment of this disclosure, a mechanism of interaction between the imitation learner and the user is provided. If the user feels dissatisfied with an optimal page layout policy output by the imitation learner, and adjusts the optimal page layout policy, the imitation learner may further learn an adjusted page layout policy to optimize a reward function. In this way, the imitation learner can continuously optimize performance of the imitation learner based on user preference, so that a capability of continuously enhancing learning of the imitation learner is enhanced.

According to a sixth possible implementation of the first aspect, obtaining page information, element information of at least one page element to be laid out, and a layout rule includes receiving page information, element information of at least one page element to be laid out, and a layout rule that are configured by the user in a user interface.

In this embodiment of this disclosure, for an interaction interface between the page layout and the user, the user may configure various types of information on the interaction interface.

According to a seventh possible implementation of the first aspect, the at least one page element to be laid out is set to be laid out on the page in descending order of sizes.

In this embodiment of this disclosure, the at least one page element to be laid out is laid out in descending order of sizes, so that layout efficiency can be improved, and a convergence speed of the reinforcement learning algorithm can be increased.

According to an eighth possible implementation of the first aspect, laying a first page element to be laid out on a page based according to the layout rule includes dividing the page into a plurality of grids, where a size of the grid is set based on a size of a smallest element in the at least one page element, and laying out the first page element to be laid out on the page according to the layout rule, where at least one vertex of a minimum external box of the first page element to be laid out coincides with a vertex of the grid.

In this embodiment of this disclosure, page elements to be laid out can be more easily aligned in a grid layout mode, and page layout efficiency is also improved.

According to a ninth possible implementation of the first aspect, the page status includes an area that cannot be laid out and an area that can be laid out on the page, and a shielding identifier is set for a grid corresponding to the area that cannot be laid out.

In this embodiment of this disclosure, the foregoing manner of describing the page status by combining a grid with a matrix can not only simplify description of the page status, but also reduce search space for a subsequent layout, increase a search speed, and improve layout efficiency.

According to a tenth possible implementation of the first aspect, determining a reward value corresponding to the page status and the layout location includes determining a distance value from a laid-out page element on the page to each of four sides of the page, counting a quantity of non-repetitive distance values along the four sides of the page, and determining the reward value based on the quantity.

In this embodiment of this disclosure, the soft rule is quantized as a reward value, so that the generated layout policy meets the soft rule as much as possible.

According to an eleventh possible implementation of the first aspect, determining a reward value corresponding to the page status and the layout location includes determining a set of distances from a laid-out page element on the page to the four sides of a canvas, and a set of horizontal spacings and a set of vertical spacings between adjacent laid-out page elements, separately determining a standard deviation of distance values in the set of distances, the set of horizontal spacings, and the set of vertical spacings, and determining the reward value based on the standard deviation.

In this embodiment of this disclosure, the soft rule is quantized as a reward value, so that the generated layout policy meets the soft rule as much as possible.

According to a second aspect, an embodiment of this disclosure provides a page layout apparatus, including an initial information obtaining module configured to obtain page information, element information of at least one page element to be laid out, and a layout rule, a reinforcement learning module configured to obtain at least one candidate page layout policy based on the page information, the element information of the at least one page element to be laid out, and the layout rule by using a reinforcement learning algorithm, and an imitation learning module configured to determine a target page layout policy from the at least one candidate page layout policy by using an imitation learning algorithm.

According to a first possible implementation of the first aspect, the layout rule includes a first-priority layout rule and a second-priority layout rule. The at least one candidate page layout policy meets the first-priority layout rule, and a reward obtained under a constraint of the second-priority layout rule is greater than a preset reward threshold.

According to a second possible implementation of the first aspect, the reinforcement learning module is configured to perform the following steps.

Step 1: Laying out, on a page according to the layout rule based on the page information and element information of a first page element to be laid out, the first page element to be laid out, and generating a page status of the page.

Step 2: Determining, according to the layout rule based on the page status and element information of a next page element to be laid out, a layout location of the next page element to be laid out on the page.

Step 3: Determining a reward value corresponding to the page status and the layout location, and updating the page status, iterating step 2 and step 3 until the at least one page element to be laid out is laid out on the page, and a page layout policy is generated, and accumulating a reward value determined in each iteration, and using a page layout policy for which an accumulated reward value meets a preset condition as the candidate page layout policy.

According to a third possible implementation of the first aspect, the reinforcement learning module is further configured to calculate an accumulated value of a reward value corresponding to each page status and each layout location in an iteration process, and determine policy merit of a current page layout policy based on the accumulated value of the reward value, and in a case in which it is determined that the policy merit is not less than a preset merit threshold, continue to iterate step 2 and step 3 until the at least one page element to be laid out is laid out on the page, and the page layout policy is generated.

According to a fourth possible implementation of the first aspect, the imitation learning module is further configured to determine a score of each candidate page layout policy based on a reward function obtained by pre-training an imitation learner, where the reward function is determined based on a ranking loss of a positive sample and a negative sample used for training the imitation learner, and the positive sample includes a page layout policy conforming to user aesthetics, and determine the target page layout policy from the at least one page layout policy layout based on the score.

According to a fifth possible implementation of the first aspect, the imitation learning module is further configured to send the target page layout policy, receive an adjustment made by a user on the target page layout policy, and use an adjusted target page layout policy as the positive sample for training the imitation learner, and train the imitation learner to obtain an optimized reward function.

According to a sixth possible implementation of the first aspect, the initial information obtaining module is further configured to receive page information, element information of at least one page element to be laid out, and a layout rule that are configured by the user in a user interface.

According to a third aspect, embodiments of this disclosure provide a computing device, including a processor, and a memory configured to store instructions executable by the processor. The processor is configured to implement one or more page layout methods according to the first aspect or the plurality of possible implementations of the first aspect when the instructions are executed.

According to a fourth aspect, embodiments of this disclosure provide a non-volatile computer-readable storage medium, where the non-volatile computer-readable storage medium stores computer program instructions. When the computer program instructions are executed by a processor, one or more page layout methods according to the first aspect or the plurality of possible implementations of the first aspect is implemented.

According to a fifth aspect, embodiments of this disclosure provide a computer program product, including computer readable code or a non-volatile computer-readable storage medium that carries computer readable code. When the computer readable code is run in an electronic device, a processor in the electronic device performs one or more page layout methods in the first aspect or the plurality of possible implementations of the first aspect.

These aspects and other aspects of this disclosure are more concise and more comprehensive in descriptions of the following (a plurality of) embodiments.

BRIEF DESCRIPTION OF DRAWINGS

The accompanying drawings included in this specification and constituting a part of this specification and this specification jointly show example embodiments, features, and aspects of this disclosure, and are intended to explain principles of this disclosure.

FIG. 3 is a schematic flowchart of a page layout method according to an embodiment of this disclosure;

FIG. 4 is a schematic diagram of a structure of a Markov model according to an embodiment of this disclosure;

DESCRIPTION OF EMBODIMENTS

Figure 1:
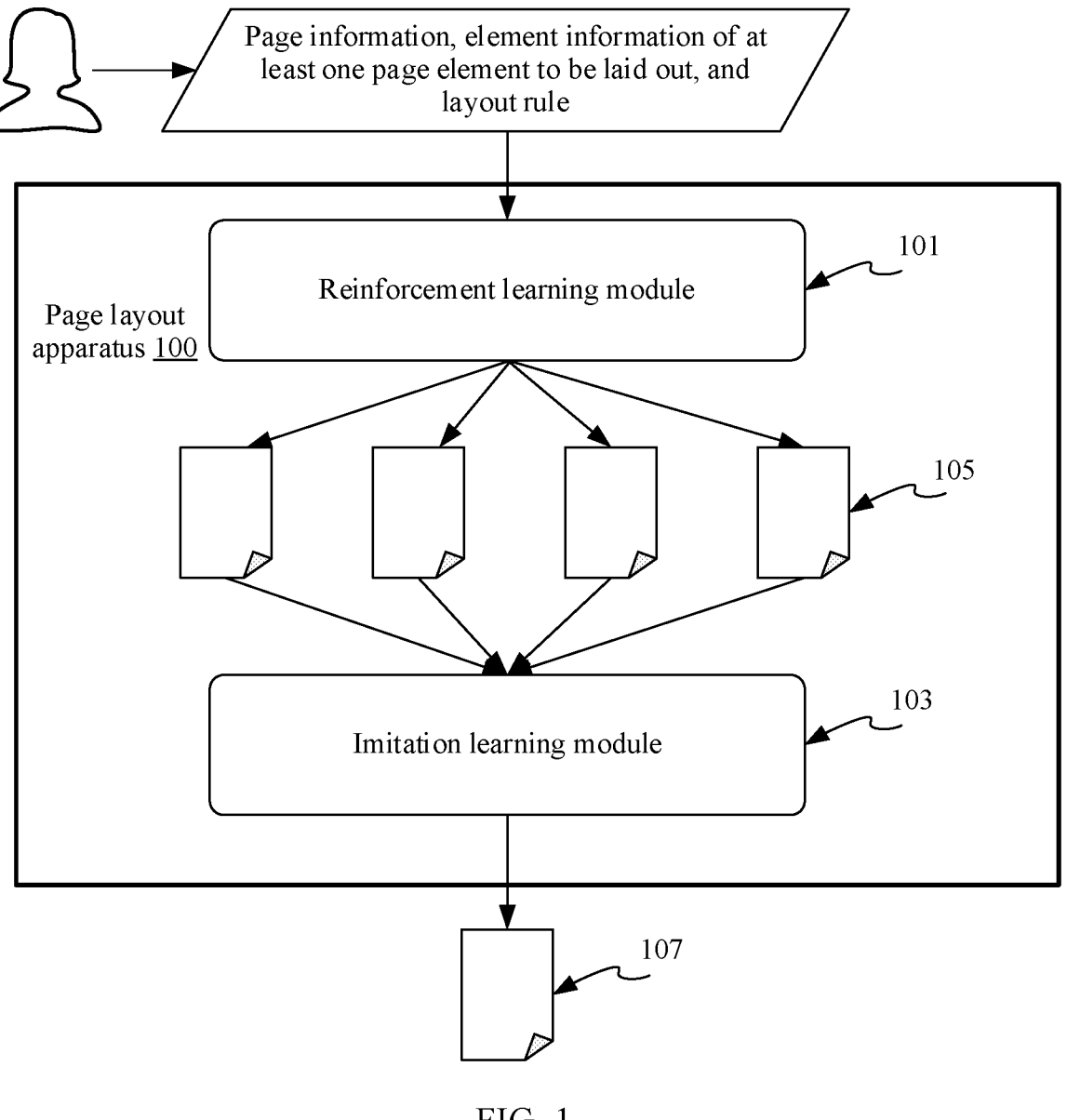
FIG. 1 is a schematic diagram of a structure of a page layout apparatus according to an embodiment of this disclosure.

The following describes various example embodiments, features, and aspects of this disclosure in detail with reference to the accompanying drawings. Identical reference numerals in the accompanying drawings indicate elements that have same or similar functions. Although various aspects of embodiments are illustrated in the accompanying drawing, the accompanying drawings are not necessarily drawn in proportion unless otherwise specified.

The specific term "example" herein means "used as an example, embodiment or illustration". Any embodiment described as "exemplary" is not necessarily explained as being superior or better than other embodiments. In the specification, claims, and accompanying drawings of this disclosure, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in embodiments of this disclosure.

In addition, to better describe this disclosure, numerous specific details are given in the following specific implementations. A person skilled in the art should understand that this disclosure can also be implemented without some specific details. In some embodiments, methods and means that are well-known to a person skilled in the art are not described in detail, so that the subject matter of this disclosure is highlighted.

To make a person skilled in the art better understand the technical solutions provided in embodiments of this disclosure, the following describes technology environment in which the technical solutions are implemented.

The core of a page layout is to lay out a plurality of page elements with different quantities, shapes and sizes on a limited page. To measure whether a page layout is an excellent page layout, it needs to be determined whether the page layout meets the following conditions. First, whether the page layout meets a hard rule. Second, whether the page layout meets a soft rule. Third, whether the page layout conforms to human aesthetics or user habits. The hard rule may include a basic rule to be followed by a page layout, for example, different page elements do not overlap, and no page element is placed in an edge area of a page. The soft rule may include a rule that does not need to be followed but can improve an aesthetic feeling of a page layout, for example, including horizontal and vertical alignment of page elements, even spacing between page elements, and the like.

Based on a technical requirement similar to the foregoing, an embodiment of this disclosure provides a page layout method. According to the method, at least one candidate page layout policy may be obtained based on page information, element information of at least one page element to be laid out, and a layout rule by using a reinforcement learning algorithm. Then, a target page layout policy is determined from the at least one candidate page layout policy by using an imitation learning algorithm. The layout rule may include a first-priority layout rule and a second-priority layout rule. The first-priority layout rule may include a hard rule. The second-priority rule may include a soft rule. In a reinforcement learning phase, on one hand, the first-priority layout rule may be used as an action constraint condition of reinforcement learning, so that the generated candidate page layout policy completely meets the hard rule. On the other hand, the second-priority layout rule may be used as a reward function of reinforcement learning, so that the generated candidate page layout policy meets the soft rule as much as possible. In an imitation learning phase, an imitation learner can be trained to interact with the user continuously and learn user's experience knowledge, so that a page layout decided by the imitation learner can better conform to the user aesthetics and habits. It can be learned that the target page layout policy obtained by using the method can not only completely meet the hard rule, and meet the soft rule as much as possible, but also can better conform to the user aesthetics and habits. Therefore, the target page layout policy meets the foregoing requirements for an excellent page layout.

The page layout method provided in this embodiment of this disclosure may be applied to a plurality of application scenarios such as graphic design, printed matter typesetting, web page design, industrial design drawing typesetting, PowerPoint presentation (PPT) typesetting, self-media typesetting, and chip back-end design.

As shown in FIG. 1, an embodiment of this disclosure provides an example of an application scenario. The scenario may include a page layout apparatus 100, and the page layout apparatus 100 may include a reinforcement learning module 101 and an imitation learning module 103.

During specific implementation, a user may configure page information, element information of at least one page element to be laid out, and a layout rule in a user interface. The page information may include a page size, a background color, a background image, and the like. The page element to be laid out may include an image, a video, a text, any combination of the foregoing plurality of elements, or the like. The element information may include a size of a page element to be laid out, a red, green, blue, and alpha (RGBA) channel value of an image pixel (for a bitmap), a description of a vector element (for a vector map), a source of an image or a video, text content, and the like. The layout rule may include a first priority rule (namely, a hard rule), a second priority rule (namely, a soft rule), and the like. In addition, for different application scenarios, a first priority rule and a second priority rule that match the application scenario may be set. This is not limited in this disclosure. The user can also configure an accumulated reward threshold, policy merit threshold, and the like for reinforcement learning in the user interface.

Figure 2:
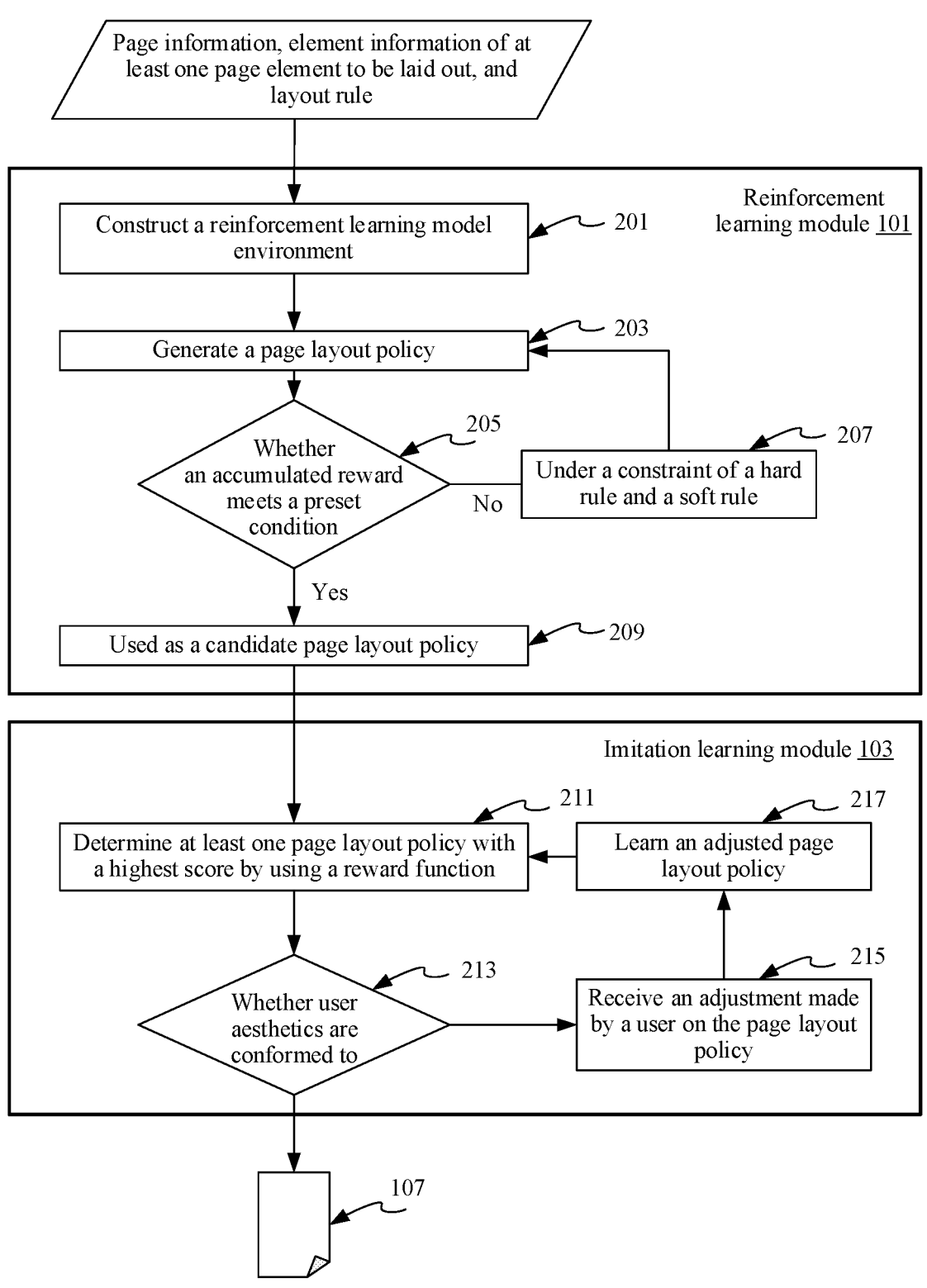
FIG. 2 is a schematic diagram of a page layout scenario according to an embodiment of this disclosure.

FIG. 2 shows internal execution processes of the reinforcement learning module 101 and the imitation learning module 103. For the execution process of the reinforcement learning module 101, in step 201, a reinforcement learning model environment may be first constructed. For example, a Markov decision model may be constructed, and parameters such as a status, an action, a reward, and a status transition of the model may be defined. In step 203, a page layout policy may be generated based on the constructed reinforcement learning model environment according to the page information, the element information, and the layout rule that are provided by the user. In step 205, it may be determined whether an accumulated reward of the page layout policy meets a reward threshold. If a determined result includes that the accumulated reward meets the reward threshold, in step 209, the page layout policy meeting the reward threshold is used as a candidate page layout policy. If a determined result includes that the accumulated reward does not meet the reward threshold, in step 207, a next page layout policy may be generated under a constraint of the layout rule (including the hard rule and the soft rule). As shown in FIG. 1, through a plurality of iterations of steps 203, 205, and 207, at least one candidate page layout policy 105 for which the accumulated reward meets the reward threshold may finally be generated.

For an internal working process of the imitation learning module 103, in step 211, a score of the at least one candidate page layout policy 105 may be determined by using a reward function, and at least one of page layout policies that best conform to human aesthetics may be determined based on the score. Then, in step 213, the determined at least one page layout policy may be sent to the user, and it is determined whether the at least one page layout policy conforms to user aesthetics. If the page layout policy does not conform to the user aesthetics, the user may adjust the page layout policy, so that an adjusted page layout policy conforms to the user aesthetics. In step 215, the imitation learning module 103 may receive an adjustment made by the user on the page layout policy, and in step 217, learn an adjusted page layout policy, so that the imitation learning module 103 better conforms to the user aesthetics. Through an iteration of step 211 to step 217, a page layout policy 107 that conforms to the user aesthetics can finally be generated.

The following describes in detail the page layout method in this disclosure with reference to the accompanying drawings. FIG. 3 is a schematic flowchart of a page layout method according to an embodiment of this disclosure.

Although this disclosure provides the method operation steps shown in the following embodiments or the accompanying drawings, the method may include more or fewer operation steps based on conventional effectors or without creative efforts. In steps that do not logically have a necessary cause-effect relationship, an execution sequence of these steps is not limited to an execution sequence provided in this embodiment of this disclosure. When the method is executed in a page layout process or apparatus, the method may be executed sequentially or in parallel (for example, in a parallel processor or a multi-thread processing environment) based on the method shown in embodiments or drawings.

Further, an embodiment of the page layout method provided in this disclosure is shown in FIG. 3. The method may be performed by the foregoing page layout apparatus 100, and the method may include the following steps.

S301: Obtain page information, element information of at least one page element to be laid out, and a layout rule.

In a preparation phase of a page layout, page information of a page may be obtained. The page information may include a size (including a width and a height) of the page, location description information of an area that can be laid out and an area that cannot be laid out of the page, background information (including a background color, background transparency, and a background image) of the page, and the like. The page element to be laid out may include an image, a video, a text, a page control, any combination of the plurality of elements, or the like. The element information may include a size of a page element to be laid out, for example, a size of an image is 640 pixels×480 pixels. When the page element to be laid out has an irregular shape, a size of a minimum external rectangle of the page element to be laid out may be used as the size of the page element to be laid out. For the image or the video, the element information may further include an RGBA channel value of an image pixel (for a bitmap), a description of a vector element (for a vector map), a style of a video playback window, a source of the image or the video, and the like. For the text, the element information may further include a size, a style, text content, a text style, and the like of a text box.

In this embodiment of this disclosure, the layout rule may be used as a rule followed when the page layout is performed by using reinforcement learning. Because of a specific reinforcement learning algorithm, the layout rule cannot be applied to the page layout by using text alone. In this embodiment of this disclosure, quantization processing may be performed on the layout rule. During specific implementation, for a hard rule, it may be determined, based on coordinate values of edges in a minimum external rectangle of a page element, whether two page elements overlap or whether a page element exceeds a range of the area that can be laid out. For another example, for a soft rule, whether a page element is aligned may be determined based on distance values from the page element to four sides of a page, and then based on a quantity of distance values that are repeated in the four directions on the page.

S303: Obtain at least one candidate page layout policy based on the page information, the element information of the at least one page element to be laid out, and the layout rule by using a reinforcement learning algorithm.

In order to express a use method of reinforcement learning in the page layout more clearly, a basic theoretical model of reinforcement learning, namely, a Markov decision process (MDP), is introduced first.

FIG. 4 is a schematic diagram of an MDP model according to this disclosure. As shown in FIG. 4, the MDP involves two main bodies that interact with each other: an agent and an environment. The agent is a main body that makes a decision, and the environment is used as a main body that feeds back information. The MDP may be represented by a quadruplet <S, A, R, T>.

(1) S is state space, and may include a set of environment statuses that the agent may perceive.

(2) A is action space, and may include a set of actions that can be taken by the agent in each environment status.

(3) R is a reward function, and R(s, a, s') may represent a reward obtained by the agent from the environment when the agent executes an action a in a status s and transits to a status s'.

(4) T is an environment state transition function, and T(s, a, s') may represent a probability that the agent executes the action a in the status s and transits to the status s'.

In an interaction process between the agent and the environment in the MDP shown in FIG. 4, the agent perceives that an environment status at a moment t is $s_t$, and based on the environment status $s_t$, the agent may select an action at from the action space A to execute. After receiving the action selected by the agent, the environment feeds back a reward signal $r_{t+1}$ to the agent, transits to a new environment status $s_{t+1}$, and waits for the agent to make a new decision. In the process of interacting with the environment, the agent aims to find an optimal policy $\pi^*$, so that $\pi^*$ can be used to obtain a maximum long-term accumulated reward under any status s and any time step t. In one example, $\pi^*$ may be defined as formula (1):

$$\pi^* = \arg\max x_\pi E_\pi\left\{\sum_{k=0}^{\infty} \gamma^k r_{t+k} | s_t = s\right\}, \forall s \in S, \forall t \geq 0 \tag{1}$$

Herein, $\pi$ represents a policy (namely, a probability distribution from a status to an action) of the agent, $E_\pi$ represents an expected value under the policy $\pi$, $\gamma$ is a discount rate, k is a future time step, and $r_{t+k}$ represents an instant reward obtained by the agent at a time step (t+k).

In this embodiment of this disclosure, the reinforcement learning model environment in this embodiment of this disclosure may be constructed based on the foregoing MDP model. Further, the reinforcement learning model environment may be set as follows.

The status $s_t$: a page status at a moment t, which may include a location description of an area that can be laid out and an area that cannot be laid out.

The action $a_t$: a layout location of a page element to be laid out on a page at a moment t, which may be represented as a location $(x_t, y_t)$ of a top-left vertex of a minimum outer matrix of the page element to be laid out on the page.

A status transition matrix $p(s_{t+1}|s_t)$: a probability that a next status $s_{t+1}$ occurs after the action $a_t$ is executed.

A reward $r_t$: A selected soft rule into a reward in a quantitative mode is converted.

In the reinforcement learning model environment, the agent may be used as an object for implementing a page layout decision. When sensing a page status, the agent may perform a corresponding action based on the page status under a constraint of a layout rule (mainly including the hard rule). The executed action may include a layout location of the page element to be laid out on the page. After receiving the action of the agent, the environment main body may give a reward signal to the agent according to the layout rule (mainly including the soft rule), and transit to a new page status.

Figure 5:
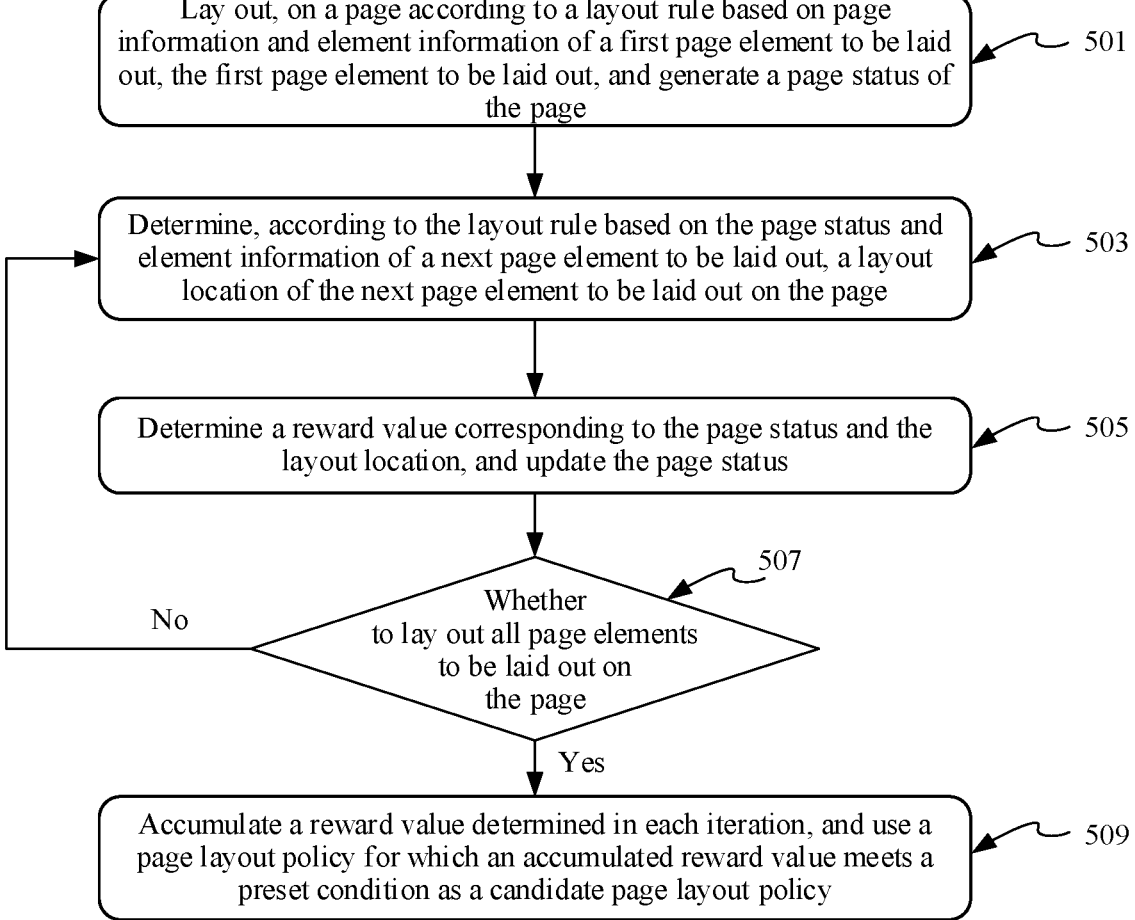
FIG. 5 is a schematic flowchart of generating a page layout policy by using a reinforcement learning algorithm according to an embodiment of this disclosure.

The following describes, by using a specific embodiment, a method for generating a candidate page layout policy by using reinforcement learning. FIG. 5 is a schematic flowchart of the method. As shown in FIG. 5, obtaining at least one candidate page layout policy based on page information, element information of at least one page element to be laid out, and a layout rule by using a reinforcement learning algorithm includes the following.

Step 501: Lay out, on a page according to a layout rule based on page information and element information of a first page element to be laid out, the first page element to be laid out, and generate a page status of the page.

Figure 6:
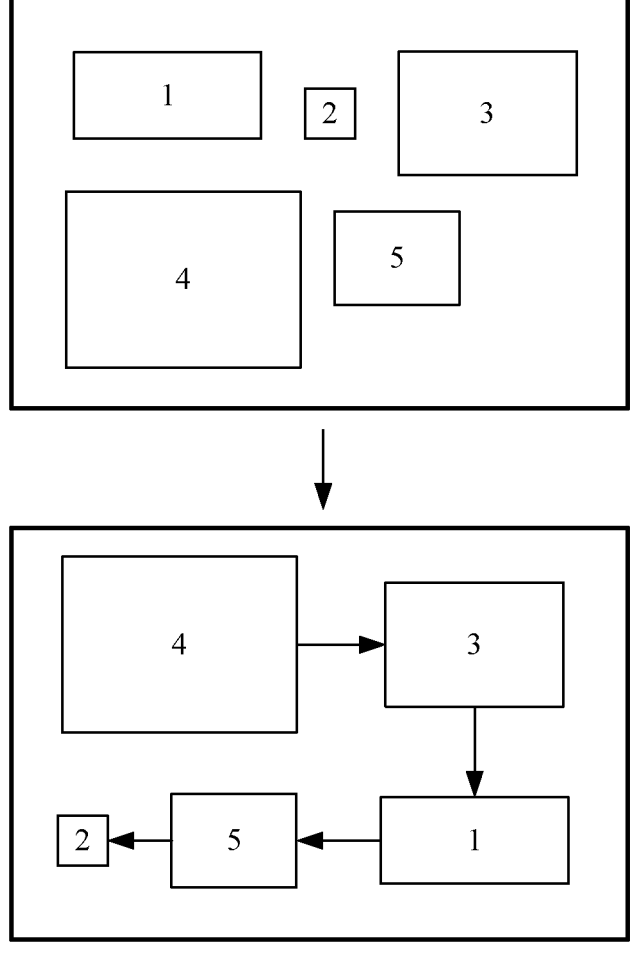
FIG. 6 is a schematic diagram of a scenario according to an embodiment of this disclosure.

In this embodiment of this disclosure, the page may be laid out by laying out one page element to be laid out at a time. By laying out the at least one page element to be laid out on the page one by one, a layout location of only one page element to be laid out may be constrained according to the layout rule in each iteration process, so that the finally obtained candidate page layout policy can completely meet the layout rule. In an embodiment of this disclosure, the at least one page element to be laid out may be laid out in descending order of sizes. As shown in an upper figure of FIG. 6, a total of five page elements to be laid out need to be laid out on the page. After the five page elements to be laid out are sorted in descending order of sizes, a layout sequence in a lower figure of FIG. 6 is shown. That is, the five page elements to be laid out may be laid out in a sequence of 4, 3, 1, 5, and 2. The at least one page element to be laid out is laid out in the descending order of sizes, so that layout efficiency can be improved, and a convergence speed of the reinforcement learning algorithm can be increased. Certainly, in another embodiment, the at least one page element to be laid out may be further laid out in any other sequence. This is not limited in this disclosure.

Figure 7:
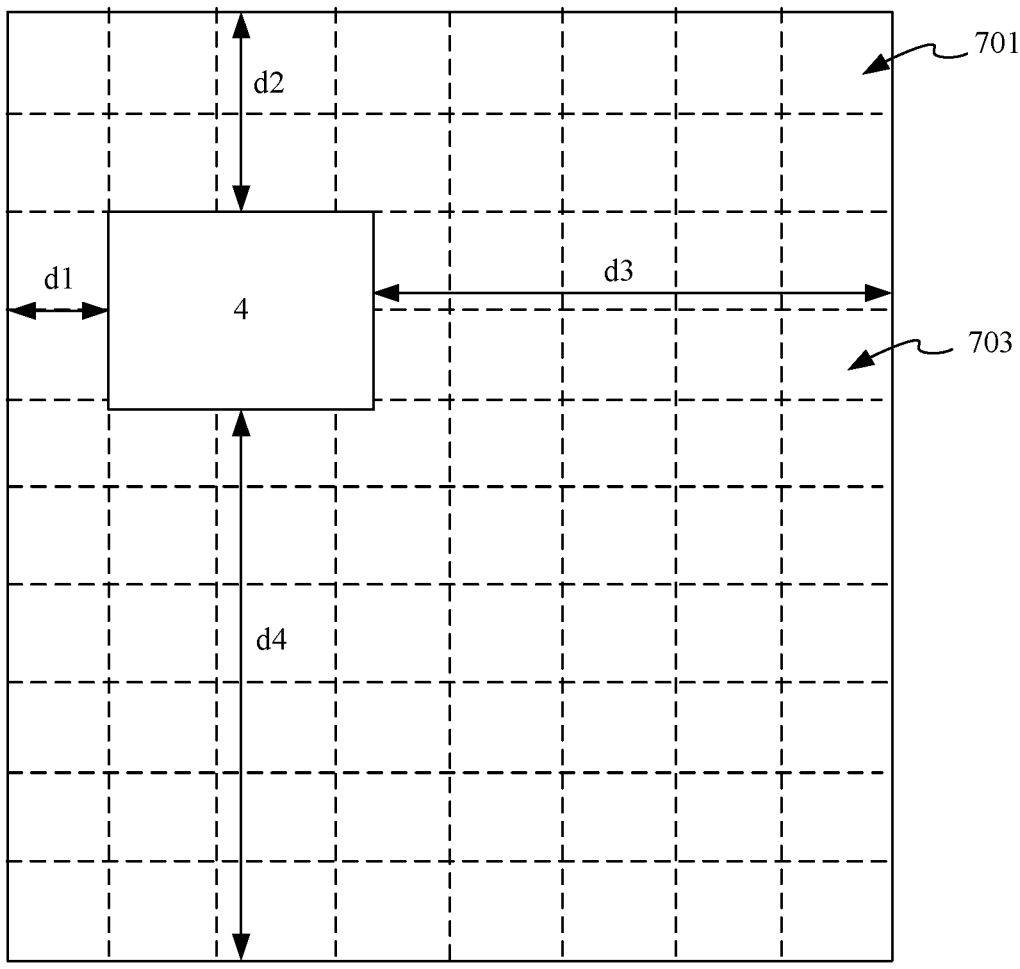
FIG. 7 is a schematic diagram of a scenario according to an embodiment of this disclosure.

In this embodiment of this disclosure, after the first page element to be laid out is determined, the first page element to be laid out may be laid out on the page according to the layout rule based on the page information and the element information of the first page element to be laid out, and the page status of the page is generated. In a specific example, as shown in FIG. 7, a page 701 is obtained, and the five page elements to be laid out shown in FIG. 6 are laid out on the page 701. A page element 4 to be laid out is used as the first page element to be laid out, and a layout of the page element 4 to be laid out on the page 701 needs to be constrained by the layout rule. The layout rule may include, for example, that different page elements to be laid out do not overlap, that the page elements to be laid out do not occupy an area that cannot be laid out on the page, that spacing of the page elements to be laid out is even, and the like. For example, the layout rule includes keeping margins of 3 centimeters (cm) left and right, and keeping margins of 5 cm up and down in the page 701. Based on this, in a process of laying out the page element to be laid out on the page 701, distances between the page element to be laid out, and the upper, lower, left, and right sides of the page 701 need to be obtained. FIG. 7 shows a schematic diagram of distances between the page element to be laid out 4 and four sides. Further, when it is determined that both d1 and d3 are greater than or equal to 3 cm, and both d2 and d4 are greater than or equal to 5 cm, it is determined that the layout of the page element 4 to be laid out meets the layout rule.

It should be noted that, to improve page layout efficiency, the page 701 may be further divided into a plurality of grids 703. A size of the grid 703 is set based on a size of a smallest element in the at least one page element to be laid out. For example, in the foregoing five page elements to be laid out, a size of a page element to be laid out 2 is the smallest. Therefore, a side length of the grid 703 may be set to be equal to a minimum side length of the page element to be laid out 2. In a process of laying out the page element to be laid out on the page, at least one vertex of an external box of the page element to be laid out and a vertex of the grid may overlap. As shown in FIG. 7, a top-left vertex of the page element to be laid out 4 and a vertex of one grid are set to overlap. The page elements to be laid out can be more easily aligned in a grid layout mode, and page layout efficiency is also improved. In addition, in another embodiment, the size of the grid 703 may alternatively be set to any other value, for example, a fixed value or a minimum margin. This is not limited in this disclosure.

In this embodiment of this disclosure, a page status of the page 701 may be generated after the first page element to be laid out is laid out on the page. The page status may include an area that cannot be laid out and an area that can be laid out on the page 701. In an embodiment, the area that cannot be laid out and the area that can be laid out may be described by using coordinates, for example, may be described by using a plurality of key points. In another embodiment of this disclosure, the area that cannot be laid out on the page 701 may be described by setting a shielding identifier. Further, after the page 701 is divided into a plurality of grids 703, it may be determined that a quantity of grids is M×N. In FIGS. 7, M=8 and N=10. In this embodiment, a shielding identifier may be set in the area that cannot be laid out. The shielding identifier indicates that a page element cannot be laid out at a corresponding location. For example, the shielding identifier may be set to "1", and another area that can be laid out is set to "0" by default. In this way, the page status of the page 701 may be described by using a matrix whose size is M×N. The foregoing manner of describing the page status by combining a grid with a matrix can not only simplify description of the page status, but also reduce search space for a subsequent layout, increase a search speed, and improve layout efficiency.

Step 503: Determine, according to the layout rule based on the page status and element information of a next page element to be laid out, a layout location of the next page element to be laid out on the page.

In this embodiment of this disclosure, the agent in the MDP model may obtain the page status, and perform the following action based on the page status and the element information of the next page element to be laid out determining, according to the layout rule, the layout location of the next page element to be laid out on the page. For example, in FIG. 6, the next page element to be laid out is a page element 3 to be laid out. According to the page status and the page element 3 to be laid out in FIG. 7, the page element 3 to be laid out may be laid out on the page 701 in a manner similar to that in the foregoing embodiment.

Step 505: Determine a reward value corresponding to the page status and the layout location, and update the page status.

Figure 8:
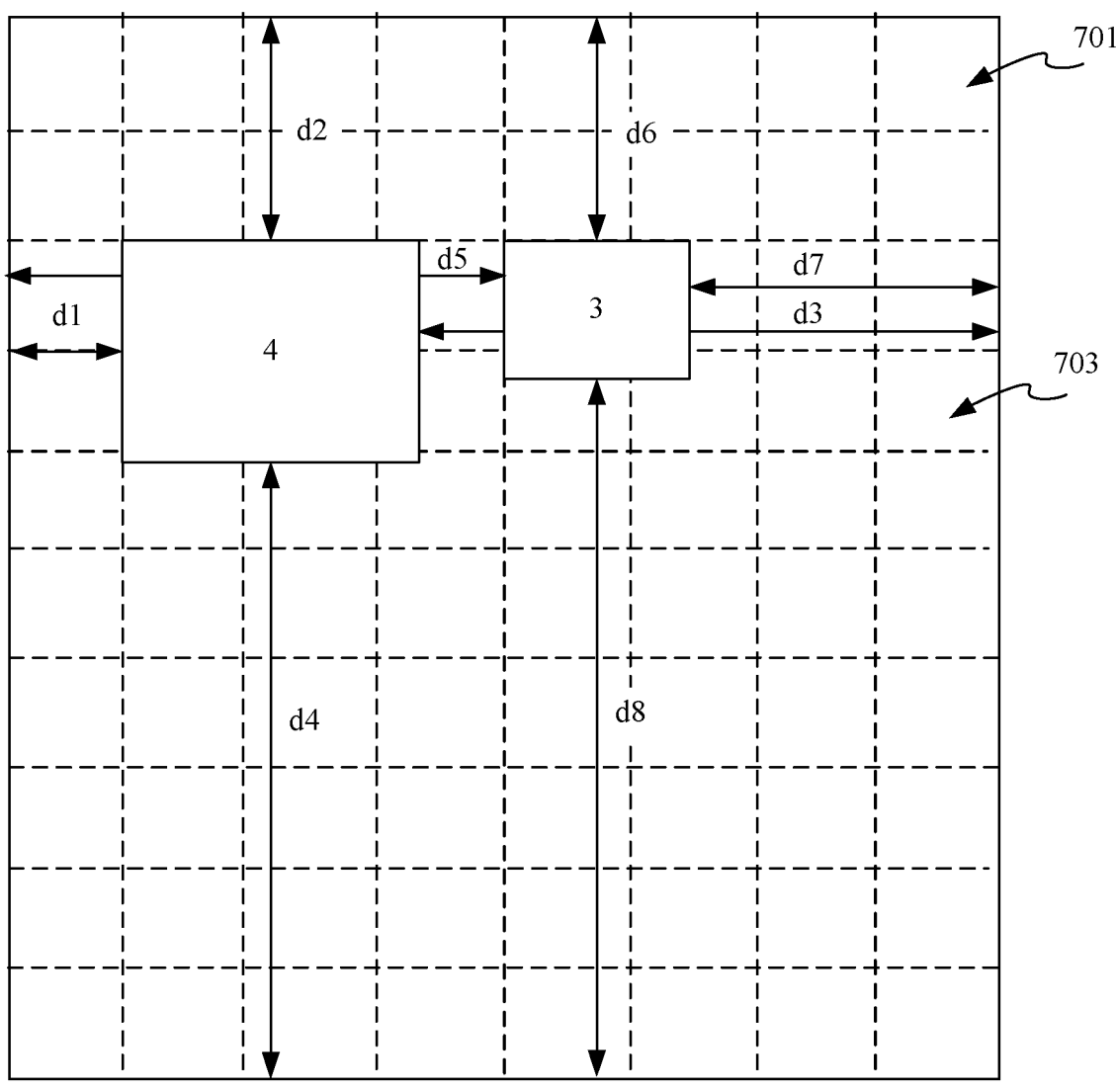
FIG. 8 is a schematic diagram of a scenario according to an embodiment of this disclosure.

In this embodiment of this disclosure, the environment main body in the MDP model may obtain an action (namely, the layout location) executed by the agent, and determine the page status and a reward value corresponding to the action. The reward value may be determined according to the layout rule, for example, the soft rule may be quantized as a reward value. In the example shown in FIG. 8, after the page element 3 to be laid out is laid out on the page 701, distance values between the laid-out page element and the four sides of the page 701 may be separately obtained. For example, distance values between the page element 4 and the four sides are d1, d2, d3, and d4, and distance values between the page element 3 and the four sides are d5, d6, d7, and d8. A quantity of non-repetitive distance values in the foregoing distance values is counted. The page status and the reward value corresponding to the action are determined based on the quantity of non-repetitive distance values. More repetitive distance values indicate a more aligned page layout. In this case, the reward value may be calculated by using the following formula:

$$reward_{align}=4 \times n - n_u - n_d - n_l - n_r$$

Herein, n is a quantity of laid-out page elements, and $n_u$, $n_d$, $n_l$ and $n_r$ are quantities of non-repetitive distance values in four directions of the page 701: a top direction, a bottom direction, a left direction, and a right direction. In this case, in the foregoing example, except that d2 and d6 are repetitive distance values, other distance values are non-repetitive distance values. In this case, the reward value=8-0-2-2-2=2.

In another embodiment of this disclosure, the soft rule that spacings between page elements are even may be further quantized as a reward value. Further, first, a set $(A_h, A_v)$ of spacings between each laid-out page element and adjacent laid-out page elements in horizontal and vertical directions may be obtained, and a set $(A_u, A_d, A_l A_r)$ of distances from each laid-out page element to the four sides of the page 701 may be obtained. Then, a standard deviation of each set of spacings and each set of distances may be calculated. A larger standard deviation indicates that spacings between laid-out page elements are more uneven. In this case, the reward value may be calculated by using the following formula:

$$reward_{gap}=-std(A_h)-std(A_v)-std(A_h)-std(A_v)-std(A_h)-std(A_v)$$

Herein, std(*) represents a standard deviation operation.

It should be noted that, in the page layout, a soft rule that may be used is not limited to the foregoing examples, and for different application scenarios, a soft rule related to an application scenario may be set. For example, in a page layout having a touch component, it may be set that a higher reward value is obtained when the touch component is laid out on a right side of the page. In addition, reward values contributed by different soft rules are different. Based on this, in an embodiment of this disclosure, weights of reward values quantized by different soft rules may be set, and a final reward value is determined based on the weights. For example, the determined final reward value may be represented as:

$$r=\alpha \times reward_{align}+\beta \times reward_{gap}$$

Herein, α is a weight of a reward value obtained through quantization based on page element alignment, and β is a weight of a reward value obtained through quantization based on even page element spacing.

In addition, after the next page element to be laid out is laid out on the page 701, the area that can be laid out and the area that cannot be laid out on the page 701 change. Based on this, the environment main body may further update the page status, and send the calculated reward value and an updated page status to the agent.

Step 507: Iterate step 503 and step 505 until the at least one page element to be laid out is laid out on the page, and a page layout policy is generated.

Step 503 and step 505 are iterated until all page elements to be laid out are laid out on the page, and the page layout policy is generated. The page layout policy may include a layout location of each page element to be laid out on the page 701. It should be noted that, a quantity of page elements to be laid out that are laid out in each iteration is not limited to one. When a quantity of page elements that need to be laid out is relatively large, two or more page elements to be laid out may be further laid out in each iteration. This is not limited in this disclosure.

Step 509: Accumulate a reward value determined in each iteration, and use a page layout policy for which an accumulated reward value meets a preset condition as the candidate page layout policy.

After all page elements to be laid out are laid out on the page 701, the reward value determined in each iteration may be accumulated, and a corresponding page layout policy obtained when the accumulated reward value meets the preset condition is used as the candidate page layout policy. The preset condition may include, for example, that the accumulated reward value is greater than a preset reward threshold.

S305: Determine a target page layout policy from the at least one candidate page layout policy by using an imitation learning algorithm.

Figure 9:
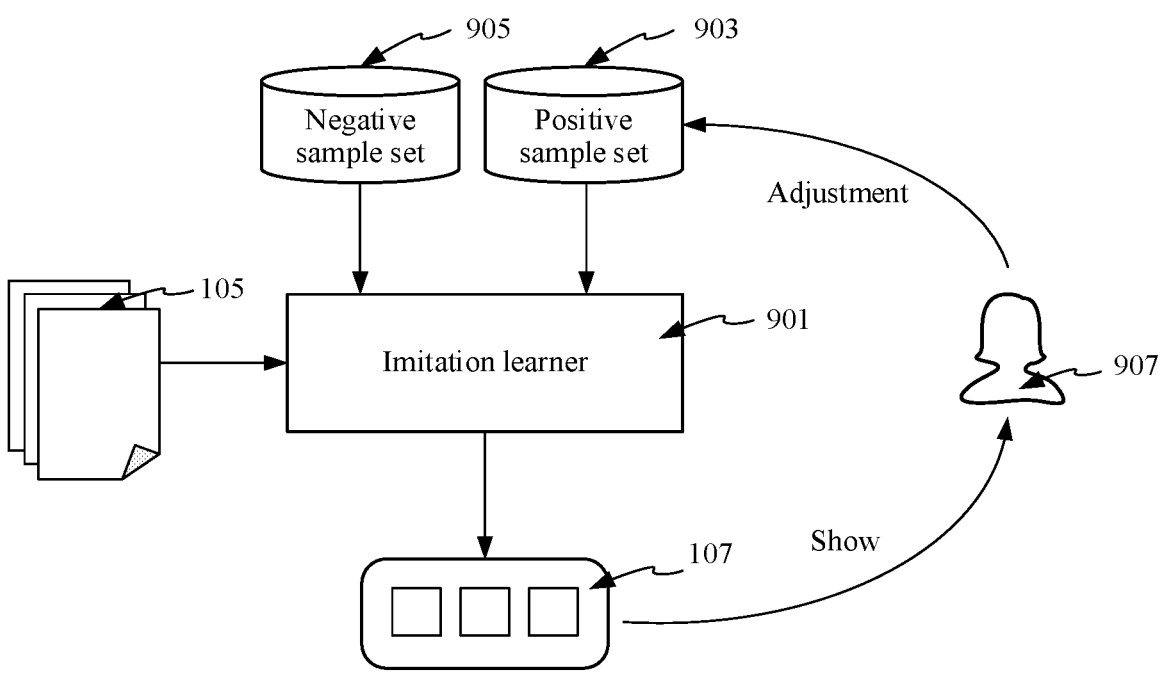
FIG. 9 is a schematic diagram of a scenario according to an embodiment of this disclosure.

Based on the foregoing overview of the internal process of the imitation learning module 103, the following describes, by using a specific embodiment, how the imitation learning module 103 determines the target page layout policy 107 from the at least one candidate page layout policy 105. FIG. 9 shows a flowchart of an implementation scenario. As shown in FIG. 9, an imitation learner 901 may be trained by using a positive sample set 903 and a negative sample set 905. The positive sample set 903 may include a plurality of page layout policy samples that conform to user aesthetics or habits. The user may include a designer, a common consumer, and the like. The negative sample set 905 may include a page layout policy sample that corresponds to a positive sample and that is obtained by using the reinforcement learning algorithm. In this embodiment of this disclosure, a reward function of the imitation learner 901 may be determined by using a ranking loss between a positive sample and a negative sample.

In an embodiment of this disclosure, in a process of training the imitation learner 901, a status-action pair set $D_{human}=\{(s_i, a_i)\}$ may be obtained from the positive sample, and the status-action pair set $D_{human}$ may include a complete historical record of a status and an action of a human expert in a process of generating a page layout policy. In another aspect, a status-action pair set $D_{agent}=\{(s_j, a_j)\}$ may be further obtained from the negative sample, and the status-action pair set $D_{agent}$ includes a complete historical record of a status and an action of an agent in a process of generating a page layout policy by using the reinforcement learning algorithm. Then, the imitation learner 901 may obtain a reward function r(s,a) through training by using $D_{human}$ and $D_{agent}$, so that a reward obtained by $D_{human}$ is greater than or equal to a reward obtained by $D_{agent}$, that is, a reward obtained by the positive sample always ranks ahead of a reward obtained by the negative sample. Further, the imitation learner 901 may use a status $s_i$ as input data, and use an action $a_i$ corresponding to $s_i$ as a label to perform imitation learning. Each status-action pair (si, ai) may obtain a reward, and the reward obtained by $D_{human}$ is an accumulated reward obtained by the status-action pair. If the reward obtained by $D_{human}$ is greater than or equal to the reward obtained by $D_{agent}$, r(s, a) can be obtained. It should be noted that the imitation learner 901 may include a multi-layer feedforward neural network such as a convolutional neural network. This is not limited in this disclosure.

In this embodiment of this disclosure, as shown in FIG. 9, the at least one candidate page layout policy 105 may be separately scored based on the reward function of the imitation learner 901 obtained through training, and one or more target page layout policies 107 with highest scores are determined. Then, the one or more target page layout policies 107 may be shown to the user If the user 905 feels satisfied with the shown one or more target page layout policies 107, the one or more target page layout policies 107 may be directly used. If the user 905 feels unsatisfied with the one or more target page layout policies 107 and adjusts the one or more target page layout policies 107, an adjusted target page layout policy may be used as a positive sample, and the imitation learner 901 is trained to learn the adjusted target page layout policy, to obtain an optimized reward function. In this way, aesthetics of the imitation learner 901 are closer to the user 907 aesthetics.

In this embodiment of this disclosure, because an image processing technology of machine learning is relatively mature, in an imitation learning phase, both the positive sample set 903 and the negative sample set 905 may be image formats. Correspondingly, before the at least one candidate page layout policy 105 is input to the imitation learner 901, the candidate page layout policy 105 may be converted into an image format, which is consistent with a format of training data.

In an application scenario, there are a plurality of layout rules related to the page layout, and the layout rules may be different in different application scenarios. However, different layout rules correspond to different importance degrees. Based on this, the layout rules may be classified into a first-priority layout rule and a second-priority layout rule, and a priority of the first-priority layout rule is higher than a priority of the second-priority layout rule. For example, the first-priority layout rule may include a hard rule, and the second-priority layout rule may include a soft rule. In this embodiment of this disclosure, the at least one candidate page layout policy meets the first-priority layout rule, and a reward obtained under constraint of the second-priority layout rule is greater than a preset reward threshold. In a specific embodiment, the first-priority layout rule may be used as a constraint condition when the agent performs an action, and the second-priority layout rule may be used as a basis for determining a reward value by the environment main body. In the foregoing implementation, the generated candidate page layout policy can completely meet the hard rule, and meet the soft rule as much as possible.

Figure 10:
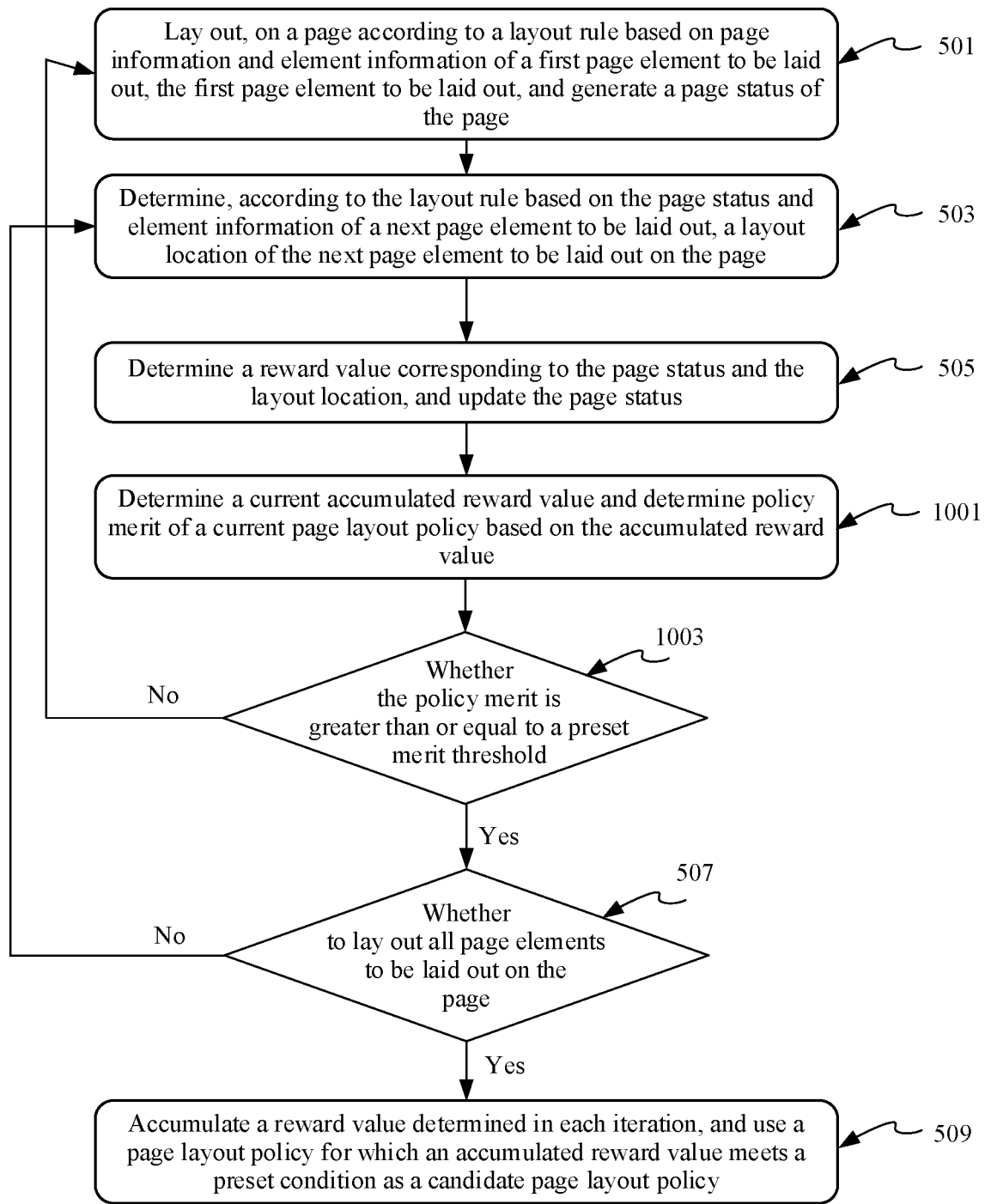
FIG. 10 is a schematic flowchart of generating a page layout policy by using a reinforcement learning algorithm according to an embodiment of this disclosure.

In an application scenario, if a quantity of page elements to be laid out is relatively large, a quantity of page layout policies that may be implemented may increase exponentially. In this embodiment of this disclosure, search space of the page layout policy may be reduced by using a Monte Carlo tree search algorithm, so that layout efficiency is improved. Further, as shown in FIG. 10, after step 505 and before step 507, the method may include the following.

Step 1001: Determine a current accumulated reward value, and determine policy merit of a current page layout policy based on the accumulated reward value.

Step 1003. Determine whether policy merit of the current page layout policy is greater than or equal to a preset merit threshold.

In this embodiment of this disclosure, in the reinforcement learning phase, one reward value may be obtained each time an iteration is performed, and an accumulated reward value of this iteration may be determined based on the obtained reward value. The policy merit of the current page layout policy (or a current page status) may be determined based on the accumulated reward value. In an example, a relationship between the policy merit and the accumulated reward may be expressed as follows:

$$\text{Value}(S_t) = \frac{1}{m} \sum_{i=1}^{m} r(S_t, a_t^i)$$

Herein, m represents a quantity of iterations that have been performed currently, and $r(S_t, a_t^i)$ represents a reward obtained by a status-action pair $(S_t, a_t^i)$.

Higher policy merit of the current page layout policy indicates that the current page layout policy is more meritable. Based on this, it may be determined whether the policy merit of the current page layout policy is greater than or equal to the preset merit threshold. When it is determined that the policy merit is greater than or equal to the preset merit threshold, step 507 may continue to be performed. In another embodiment of this disclosure, as shown in FIG. 10, when it is determined that the policy merit is less than the preset merit threshold, the current page layout policy may be excluded, and step 501 is returned to start a new layout.

In this embodiment of this disclosure, in a reinforcement learning process, the Monte Carlo tree search algorithm is used to reduce the search space of the page layout, so that search complexity can be greatly reduced in a case in which there are a large quantity of page elements to be laid out. In addition, by estimating long-term benefit of an intermediate node through a merit function, a page layout strategy with a higher reward value can be obtained while the search space is reduced.

Figure 11:
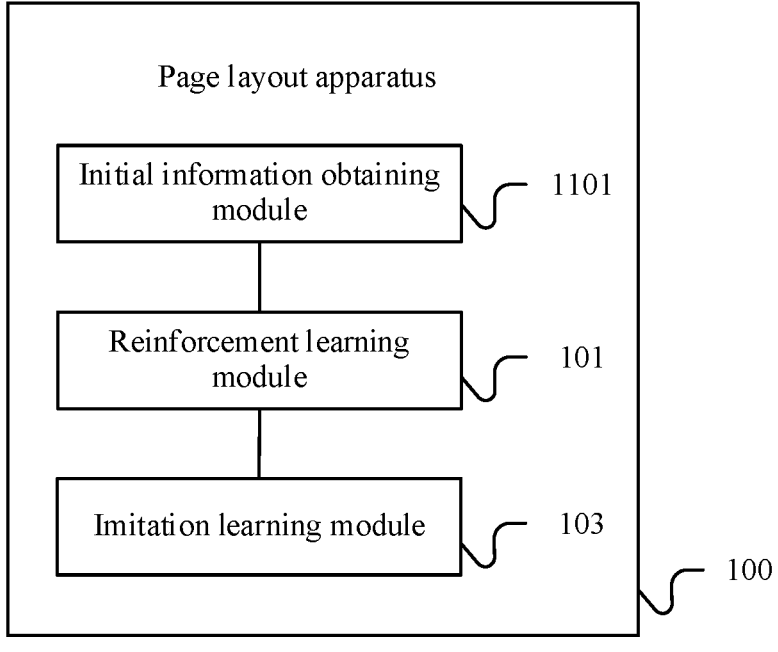
FIG. 11 is a schematic diagram of a structure of another page layout apparatus according to an embodiment of this disclosure.

Another aspect of this disclosure further provides another embodiment of the page layout apparatus 100. As shown in FIG. 11, the page layout apparatus 100 may include an initial information obtaining module 1101 configured to obtain page information, element information of at least one page element to be laid out, and a layout rule, a reinforcement learning module 101 configured to obtain at least one candidate page layout policy based on the page information, the element information of the at least one page element to be laid out, and the layout rule by using a reinforcement learning algorithm, and an imitation learning module 103 configured to determine a target page layout policy from the at least one candidate page layout policy by using an imitation learning algorithm.

Optionally, in an embodiment of this disclosure, the layout rule includes a first-priority layout rule and a second-priority layout rule. The at least one candidate page layout policy meets the first-priority layout rule, and a reward obtained under a constraint of the second-priority layout rule is greater than a preset reward threshold.

Optionally, in an embodiment of this disclosure, the reinforcement learning module is further configured to perform the following steps.

Step 1: Laying out, on a page according to the layout rule based on the page information and element information of a first page element to be laid out, the first page element to be laid out, and generating a page status of the page.

Step 2: Determining, according to the layout rule based on the page status and element information of a next page element to be laid out, a layout location of the next page element to be laid out on the page.

Step 3: Determining a reward value corresponding to the page status and the layout location, and updating the page status, iterating step 2 and step 3 until the at least one page element to be laid out is laid out on the page, and a page layout policy is generated, and accumulating a reward value determined in each iteration, and using a page layout policy for which an accumulated reward value meets a preset condition as the candidate page layout policy.

Optionally, in an embodiment of this disclosure, the reinforcement learning module is further configured to calculate an accumulated value of a reward value corresponding to each page status and each layout location in an iteration process, and determine policy merit of a current page layout policy based on the accumulated value of the reward value, and in a case in which it is determined that the policy merit is not less than a preset merit threshold, continue to iterate step 2 and step 3 until the at least one page element to be laid out is laid out on the page, and the page layout policy is generated.

Optionally, in an embodiment of this disclosure, the imitation learning module is further configured to determine a score of each candidate page layout policy based on a reward function obtained by pre-training an imitation learner, where the reward function is determined based on a ranking loss of a positive sample and a negative sample used for training the imitation learner, and the positive sample includes a page layout policy conforming to user aesthetics, and determine the target page layout policy from the at least one page layout policy layout based on the score.

Optionally, in an embodiment of this disclosure, the imitation learning module is further configured to send the target page layout policy, receive an adjustment made by a user on the target page layout policy, and use an adjusted target page layout policy as the positive sample for training the imitation learner, and train the imitation learner to obtain an optimized reward function.

Optionally, in an embodiment of this disclosure, the initial information obtaining module is further configured to receive page information, element information of at least one page element to be laid out, and a layout rule that are configured by the user in a user interface.

The page layout apparatus 100 according to this embodiment of this disclosure may correspondingly perform the method described in embodiments of this disclosure. In addition, the foregoing and other operations and/or functions of the modules in the page layout apparatus 100 are separately used to implement corresponding processes of the methods in FIG. 2, FIG. 3, FIG. 5, and FIG. 10. For brevity, details are not described herein again.

In addition, it should be noted that the embodiments described above are merely examples. The modules described as separate parts may or may not be physically separate, and parts displayed as modules may or may not be physical modules, may be located in one position, or may be distributed on a plurality of network modules. Some or all the modules may be selected according to needs to achieve the objectives of the solutions of embodiments. In addition, in the accompanying drawings of the apparatus embodiments provided by this disclosure, connection relationships between modules indicate that the modules have communication connections with each other, which may be implemented as one or more communication buses or signal cables.

Embodiments of this disclosure further provide a device 1200 configured to implement a function of the page layout apparatus 100 in the system architecture diagram shown in FIG. 1. The device 1200 may be a physical device or a physical device cluster, or may be a virtualized device, for example, at least one cloud virtual machine in a cloud computing cluster. For ease of understanding, this disclosure describes a structure of the device 1200 by using an example.

Figure 12:
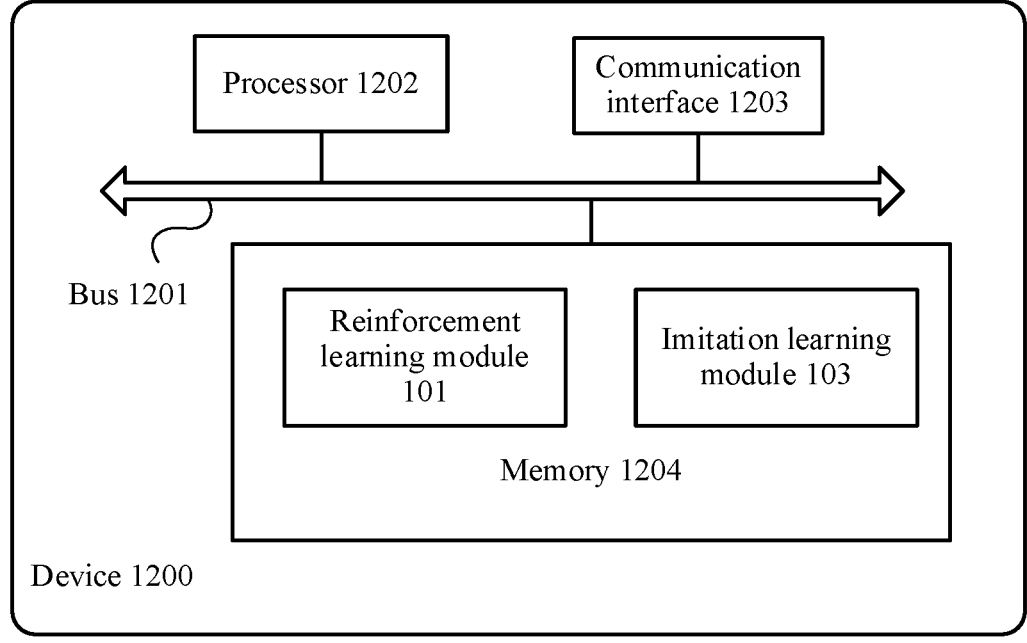
FIG. 12 is a schematic diagram of a module structure of a computing device according to an embodiment of this disclosure.

FIG. 12 is a schematic diagram of a structure of the device 1200. As shown in FIG. 12, the device 1200 includes a bus 1201, a processor 1202, a communication interface 1203, and a memory 1204. The processor 1202, the memory 1204, and the communication interface 1203 communicate with each other by using the bus 1201. The bus 1201 may be a Peripheral Component Interconnect (PCI) bus, an Extended Industry Standard Architecture (EISA) bus, or the like. Buses may be classified into an address bus, a data bus, a control bus, and the like. For ease of representation, only one bold line is used to represent the bus in FIG. 12, but this does not mean that there is only one bus or only one type of bus. The communication interface 1203 is configured to communicate with the outside, to obtain, for example, page information or information about the at least one page element to be laid out.

The processor 1202 may be a central processing unit (CPU). The memory 1204 may include a volatile memory, for example, a random-access memory (RAM). Alternatively, the memory 1204 may include a non-volatile memory, for example, a read-only memory (ROM), a flash memory, a hard disk drive (HDD), or a solid-state drive (SSD).

The memory 1204 stores executable code. The processor 1202 executes the executable code to perform the foregoing page layout method.

Further, when the embodiment shown in FIG. 1 is implemented, and the modules of the page layout apparatus 100 described in the embodiment in FIG. 1 are implemented by using software, software or program code required for performing functions of the reinforcement learning module 101 and the imitation learning module 103 in FIG. 1 is stored in the memory 1204. The processor 1202 executes program code that is corresponding to each module and that is stored in the memory 1204, for example, program code corresponding to the reinforcement learning module 101 and the imitation learning module 103, to obtain at least one candidate page layout policy, and determine a target page layout policy from the at least one candidate page layout policy. The processor 1202 may further execute program code corresponding to the initial information obtaining module 1101 shown in FIG. 11.

Embodiments of this disclosure provide a non-volatile computer-readable storage medium, where the non-volatile computer-readable storage medium stores computer program instructions. When the computer program instructions are executed by a processor, the foregoing methods are implemented.

Embodiments of this disclosure provide a computer program product, including computer-readable code or a non-volatile computer-readable storage medium carrying computer-readable code. When the computer-readable code is run in a processor of an electronic device, the processor in the electronic device performs the foregoing methods.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (non-exhaustive list) of the computer-readable storage medium include a portable computer disk, a hard disk, a RAM, a ROM, an erasable programmable ROM (EPROM or flash memory), a static RAM (SRAM), a portable compact disc (CD) ROM (CD-ROM), a DIGITAL VERSATILE DISC (DVD), a memory stick, a floppy disk, a mechanical coding device, for example, a punching card or a groove protrusion structure that stores instructions, and any suitable combination thereof.

The computer-readable program instructions or code described herein may be downloaded from a computer-readable storage medium to each computing/processing device, or downloaded to an external computer or an external storage device over a network, such as the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this disclosure may be assembly instructions, instruction set architecture (ISA) instructions, machine instructions, machine-related instructions, microcode, firmware instructions, status setting data, or source code or target code written in one or any combination of more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer over any type of network, including a local area network (LAN) or a wide area network (WAN), or may be connected to an external computer (for example, connected by using an Internet service provider over the Internet). In some embodiments, an electronic circuit, for example, a programmable logic circuit, a field-programmable gate array (FPGA), or a programmable logic array (PLA), is customized by using status information of computer-readable program instructions. The electronic circuit may execute the computer-readable program instructions, to implement various aspects of this disclosure.

The various aspects of this disclosure are described herein with reference to the flowcharts and/or the block diagrams of the method, the apparatus (system), and the computer program product according to embodiments of this disclosure. It should be understood that each block in the flowcharts and/or the block diagrams and combinations of blocks in the flowcharts and/or the block diagrams may be implemented by computer-readable program instructions.

These computer-readable program instructions may be provided to a processor of a general-purpose computer, a special-purpose computer, or another programmable data processing apparatus to produce a machine, so that the instructions, when executed by the processor of the computer or another programmable data processing apparatus, create an apparatus for implementing functions/actions specified in one or more blocks in the flowcharts and/or the block diagrams. Alternatively, these computer-readable program instructions may be stored in a computer-readable storage medium. These instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, these computer-readable program instructions may be loaded onto a computer, another programmable data processing apparatus, or another device, so that a series of operation steps are performed on the computer, the other programmable data processing apparatus, or the other device to produce a computer-implemented process. Therefore, the instructions executed on the computer, the other programmable data processing apparatus, or the other device implements functions/actions specified in one or more blocks in the flowcharts and/or the block diagrams.

The flowcharts and the block diagrams in the appended drawings illustrate system architectures, functions, and operations of possible implementations of apparatuses, systems, methods, and computer program products according to a plurality of embodiments of this disclosure. In this regard, each block in the flowcharts or the block diagrams may represent a module, a program segment, or a part of the instructions, where the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved.

It should also be noted that each block in the block diagrams and/or the flowcharts and a combination of blocks in the block diagrams and/or the flowcharts may be implemented by hardware (for example, a circuit or an application-specific integrated circuit (ASIC) that performs a corresponding function or action, or may be implemented by a combination of hardware and software, for example, firmware.

Although the present disclosure is described with reference to embodiments, in a process of implementing the present disclosure that claims protection, a person skilled in the art may understand and implement another variation of the disclosed embodiments by viewing the accompanying drawings, the disclosed content, and the accompanying claims. In the claims, "comprising" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Embodiments of this disclosure are described above. The foregoing descriptions are examples, are not exhaustive, and are not limited to the disclosed embodiments. Many modifications and changes are apparent to a person of ordinary skill in the art without departing from the scope and spirit of the described embodiments. The selection of terms used in this specification is intended to best explain the principles of the embodiments, practical application, or improvements to technologies in the market, or to enable another person of ordinary skill in the art to understand the embodiments disclosed in this specification.

What is claimed is:

1. A method comprising:

obtaining page information, first element information of at least one page element to be laid out, and a layout rule;

obtaining at least one candidate page layout policy based on the page information, the first element information, and the layout rule using a reinforcement learning algorithm; and determining a target page layout policy from the at least one candidate page layout policy using an imitation learning algorithm by:

pre-training an imitation learner to obtain a reward function, wherein the reward function is based on a ranking loss of a positive sample and a negative sample used for training the imitation learner, and wherein the positive sample comprises a page layout policy conforming to user aesthetics;

determining a score of each candidate page layout policy based on the reward function; and determining the target page layout policy based on the score.

2. The method of claim 1, wherein the layout rule comprises a first-priority layout rule and a second-priority layout rule, wherein the at least one candidate page layout policy meets the first-priority layout rule, and wherein the method further comprises obtaining a reward, under a constraint of the second-priority layout rule, that is greater than a preset reward threshold.

3. The method of claim 1, further comprising:

step 1: laying out, on a page according to the layout rule based on the page information and second element information of a first page element to be laid out, the first page element and generating a page status of the page;

step 2: determining, according to the layout rule based on the page status and third element information of a next page element to be laid out, a layout location of the next page element;

step 3: determining a first reward value corresponding to the page status and the layout location and updating the page status;

iterating step 2 and step 3 until the at least one page element to be laid out is laid out on the page and a first page layout policy is generated; and accumulating the first reward value determined in each iteration to obtain an accumulated reward value and setting a second page layout policy of a plurality of first page layout policies for which the accumulated reward value meets a preset condition as the at least one candidate page layout policy.

4. The method of claim 3, wherein iterating step 2 and step 3 until the at least one page element is laid out on the page and the first page layout policy is generated comprises:

calculating a current accumulated reward value of a second reward value corresponding to each page status and each layout location in an iteration process and determining a policy merit of a current page layout policy based on the current accumulated reward value;

determining that the policy merit is not less than a preset merit threshold; and continuing, in response to determining that the policy merit is not less than the preset merit threshold, to iterate step 2 and step 3 until the at least one page element to be laid out is laid out on the page and the first page layout policy is generated.

5. The method of claim 1, further comprising applying the target page layout policy to a page.

6. The method of claim 1, wherein after determining the target page layout policy, the method further comprises:

sending the target page layout policy;

receiving an adjustment made by a user on the target page layout policy;

setting an adjusted target page layout policy as the positive sample for training the imitation learner; and training the imitation learner to obtain an optimized reward function.

7. The method of claim 1, wherein obtaining the page information, the element information, and the layout rule comprises receiving the page information, the first element information, and the layout rule from a user in a user interface.

8. A computing device comprising:

a memory configured to store instructions; and a processor coupled to the memory and configured to execute the instructions to cause the computing device to:

obtain page information, first element information of at least one page element to be laid out, and a layout rule;

obtain at least one candidate page layout policy based on the page information, the first element information, and the layout rule using a reinforcement learning algorithm; and determine a target page layout policy from the at least one candidate page layout policy using an imitation learning algorithm by:

pre-training an imitation learner to obtain a reward function, wherein the reward function is based on a ranking loss of a positive sample and a negative sample used for training the imitation learner, and wherein the positive sample comprises a page layout policy conforming to user aesthetics;

determining a score of each candidate page layout policy based on the reward function; and determining the target page layout policy based on the score.

9. The computing device of claim 8, wherein the layout rule comprises a first-priority layout rule and a second-priority layout rule, wherein the at least one candidate page layout policy meets the first-priority layout rule, and wherein the processor is further configured to execute the instructions to cause the computing device to obtain a reward, under a constraint of the second-priority layout rule, that is greater than a preset reward threshold.

10. The computing device of claim 8, wherein the processor is further configured to execute the instructions to cause the computing device to:

step 1: lay out, on a page according to the layout rule based on the page information and second element information of a first page element to be laid out, the first page element and generate a page status of the page;

step 2: determine, according to the layout rule based on the page status and third element information of a next page element to be laid out, a layout location of the next page element;

step 3: determine a first reward value corresponding to the page status and the layout location and update the page status;

iterate step 2 and step 3 until the at least one page element to be laid out is laid out on the page and a first page layout policy is generated; and accumulate the first reward value determined in each iteration to obtain an accumulated reward value and set a second page layout policy of a plurality of first page layout policies for which the accumulated reward value meets a preset condition as the at least one candidate page layout policy.

11. The computing device of claim 10, wherein the processor is further configured to execute the instructions to cause the computing device to:

calculate a current accumulated reward value of a second reward value corresponding to each page status and each layout location in an iteration process and determine a policy merit of a current page layout policy based on the current accumulated reward value;

determine that the policy merit is not less than a preset merit threshold; and continue, in response to determining that the policy merit is not less than the preset merit threshold, to iterate step 2 and step 3 until the at least one page element to be laid out is laid out on the page and the first page layout policy is generated.

12. The computing device of claim 8, wherein the processor is further configured to execute the instructions to cause the computing device to apply the target page layout policy to a page.

13. The computing device of claim 8, wherein after determining the target page layout policy, the processor is further configured to execute the instructions to cause the computing device to:

send the target page layout policy;

receive an adjustment made by a user on the target page layout policy;

set an adjusted target page layout policy as the positive sample for training the imitation learner; and train the imitation learner to obtain an optimized reward function.

14. The computing device of claim 8, wherein the processor is further configured to execute the instructions to cause the computing device to receive the page information, the first element information, and the layout rule from a user in a user interface.

15. A computer program product comprising computer-executable instructions that are stored on a non-transitory computer-readable medium and that, when executed by a processor, cause a computing device to:

obtain page information, first element information of at least one page element to be laid out, and a layout rule;

obtain at least one candidate page layout policy based on the page information, the first element information, and the layout rule using a reinforcement learning algorithm; and determine a target page layout policy from the at least one candidate page layout policy using an imitation learning algorithm by:

pre-training an imitation learner to obtain a reward function, wherein the reward function is based on a ranking loss of a positive sample and a negative sample used for training the imitation learner, and wherein the positive sample comprises a page layout policy conforming to user aesthetics;

determining a score of each candidate page layout policy based on the reward function; and determining the target page layout policy based on the score.

16. The computer program product of claim 15, wherein the layout rule comprises a first-priority layout rule and a second-priority layout rule, wherein the at least one candidate page layout policy meets the first-priority layout rule, and wherein the computer-executable instructions further cause the computing device to obtain a reward, under a constraint of the second-priority layout rule, that is greater than a preset reward threshold.

17. The computer program product of claim 15, wherein the computer-executable instructions further cause the computing device to:

step 1: lay out, on a page according to the layout rule based on the page information and second element information of a first page element to be laid out, the first page element and generate a page status of the page;

step 2: determine, according to the layout rule based on the page status and third element information of a next page element to be laid out, a layout location of the next page element;

step 3: determine a first reward value corresponding to the page status and the layout location and update the page status;

iterate step 2 and step 3 until the at least one page element to be laid out is laid out on the page and a first page layout policy is generated; and accumulate the first reward value determined in each iteration to obtain an accumulated reward value and set a second page layout policy of a plurality of first page layout policies for which the accumulated reward value meets a preset condition as the at least one candidate page layout policy.

18. The computer program product of claim 17, wherein the computer-executable instructions further cause the computing device to:

calculate a current accumulated reward value of a second reward value corresponding to each page status and each layout location in an iteration process and determine a policy merit of a current page layout policy based on the current accumulated reward value;

determine that the policy merit is not less than a preset merit threshold; and continue, in response to determining that the policy merit is not less than the preset merit threshold, to iterate step 2 and step 3 until the at least one page element to be laid out is laid out on the page and the first page layout policy is generated.

19. The computer program product of claim 15, wherein the computer-executable instructions further cause the computing device to apply the target page layout policy to a page.

20. The computer program product of claim 15, wherein after determining the target page layout policy, the computer-executable instructions further cause the computing device to:

send the target page layout policy;

receive an adjustment made by a user on the target page layout policy;

set an adjusted target page layout policy as the positive sample for training the imitation learner; and train the imitation learner to obtain an optimized reward function.

* * * * *